US009622463B2

(12) United States Patent
Thompson

(10) Patent No.: US 9,622,463 B2
(45) Date of Patent: Apr. 18, 2017

(54) ACCESSORY FOR A TREBLE FISHING HOOK

(71) Applicant: Edwin John Thompson, Saanichton (CA)

(72) Inventor: Edwin John Thompson, Saanichton (CA)

( * ) Notice: Subject to any disclaimer, the term of this patent is extended or adjusted under 35 U.S.C. 154(b) by 47 days.

(21) Appl. No.: 14/546,063

(22) Filed: Nov. 18, 2014

(65) Prior Publication Data

US 2016/0135440 A1    May 19, 2016

(51) Int. Cl.
| | | |
|---|---|---|
| *A01K 85/00* | (2006.01) |
| *A01K 85/02* | (2006.01) |
| *A01K 83/06* | (2006.01) |
| *A01K 97/06* | (2006.01) |
| *A01K 85/16* | (2006.01) |
| *A01K 83/00* | (2006.01) |

(52) U.S. Cl.
CPC .............. *A01K 85/16* (2013.01); *A01K 83/00* (2013.01); *A01K 83/06* (2013.01); *A01K 85/00* (2013.01); *A01K 85/02* (2013.01); *A01K 97/06* (2013.01)

(58) Field of Classification Search
CPC ........ A01K 85/00; A01K 85/02; A01K 83/06; A01K 97/06
USPC ... 43/42.1, 42.28, 42.24, 42.37, 42.32, 42.4, 43/42.41, 42.43, 43.2, 43.4, 57.1, 44.2, 43/44.4, 44.8
See application file for complete search history.

(56) References Cited

U.S. PATENT DOCUMENTS

| | | | | |
|---|---|---|---|---|
| 867,439 A * | 10/1907 | Staehle | ................. | A01K 97/06 43/43.2 |
| 890,549 A * | 6/1908 | Zamel | .................... | A01K 85/02 43/42.1 |
| 913,102 A * | 2/1909 | Burke | .................... | A01K 85/02 43/35 |
| 981,454 A * | 1/1911 | Miller | .................... | A01K 85/02 43/42.1 |
| 1,154,168 A * | 9/1915 | Bosserman | ........... | A01K 85/02 43/42.1 |
| 1,255,516 A * | 2/1918 | Daller | ................... | A01K 97/06 43/57.1 |
| 1,689,027 A * | 10/1928 | Helle | .................... | A01K 85/02 43/42.1 |

(Continued)

FOREIGN PATENT DOCUMENTS

DE          2511860          10/1976

*Primary Examiner* — Darren W Ark
(74) *Attorney, Agent, or Firm* — Kyle R. Satterthwaite; Ryan W. Dupuis; Ade & Company Inc.

(57) ABSTRACT

An accessory for a treble fishing hook features an attachment body spanning about a longitudinal axis on which an opening extends into said attachment body. The attachment body has a plurality of slots spaced apart around said longitudinal axis, and each slot has a first leg extending axially into the attachment body from a first axial end of the attachment body toward an opposing second axial end thereof. Each slot is arranged to receive and engage an intermediate portion of a respective hook of the fishing hook into the slot via an open end of the first leg of the slot at the first axial end of the attachment body. The attachment hangs from the intermediate portions of the hooks to support a dressing on the treble hook while leaving the tips or points of the hooks unobscured for normal use during a fish bite.

14 Claims, 1 Drawing Sheet

(56) References Cited

U.S. PATENT DOCUMENTS

| | | | | |
|---|---|---|---|---|
| 1,865,359 A | * | 6/1932 | Eger | A01K 85/10 43/42.37 |
| 1,948,983 A | * | 2/1934 | Danielesuk | A01K 85/02 43/42.1 |
| 2,000,954 A | * | 5/1935 | Hopkins | A01K 83/06 43/44.2 |
| 2,136,713 A | * | 11/1938 | Schnabel | A01K 85/02 43/42.1 |
| 2,185,507 A | * | 1/1940 | Knapp | A01K 97/06 43/43.2 |
| 2,191,244 A | * | 2/1940 | Wise | A01K 85/02 43/42.1 |
| 2,204,185 A | * | 6/1940 | Lougheed | A01K 97/06 43/57.1 |
| 2,214,360 A | * | 9/1940 | Woodley | A01K 85/02 43/42.1 |
| 2,261,068 A | * | 10/1941 | Mackovich | A01K 85/02 43/42.1 |
| 2,278,876 A | * | 4/1942 | Hart | A01K 85/08 43/42.28 |
| 2,473,564 A | * | 6/1949 | Bergren | A01K 83/00 43/43.2 |
| 2,476,733 A | * | 7/1949 | Jacobs | A01K 85/02 43/42.1 |
| 2,482,881 A | * | 9/1949 | Sonner, Jr. | A01K 97/06 43/43.4 |
| 2,492,557 A | * | 12/1949 | Deimler | A01K 83/06 43/44.8 |
| 2,520,544 A | * | 8/1950 | Hook | A01K 83/00 43/43.4 |
| 2,522,292 A | * | 9/1950 | Modesto | A01K 83/00 43/43.4 |
| 2,590,461 A | * | 3/1952 | Rasch | A01K 85/02 43/42.1 |
| 2,600,314 A | * | 6/1952 | Miner | A01K 83/06 43/42.1 |
| D167,803 S | * | 9/1952 | Miller | 43/57.1 |
| 2,616,209 A | * | 11/1952 | Ploen | A01K 97/06 43/43.2 |
| 2,618,095 A | * | 11/1952 | Igo | A01K 83/00 43/43.4 |
| 2,685,756 A | * | 8/1954 | Mowbray | A01K 97/06 43/57.1 |
| 2,697,295 A | * | 12/1954 | Hinds | A01K 83/06 43/44.8 |
| 2,718,086 A | * | 9/1955 | Miner | A01K 85/02 43/42.1 |
| 2,811,804 A | * | 11/1957 | Heath | A01K 83/00 43/42.1 |
| 2,913,849 A | * | 11/1959 | Rolstone | A01K 85/02 43/42.41 |
| 2,981,027 A | * | 4/1961 | Dewyer | A01K 85/02 43/42.1 |
| 3,012,356 A | * | 12/1961 | Tyson | A01K 85/00 43/42.28 |
| 3,012,358 A | * | 12/1961 | Multanen | A01K 85/12 43/42.28 |
| 3,060,620 A | * | 10/1962 | Binkowski | A01K 85/02 43/42.41 |
| 3,079,723 A | * | 3/1963 | Roes | A01K 85/00 43/42.37 |
| 3,170,756 A | * | 2/1965 | Butler | A01K 83/00 43/42.1 |
| 3,230,656 A | * | 1/1966 | Kozjak | A01K 85/02 43/42.1 |
| 3,683,541 A | * | 8/1972 | Cather | A01K 83/00 43/42.1 |
| 3,815,274 A | * | 6/1974 | Schleif | A01K 85/02 43/42.1 |
| 4,163,337 A | * | 8/1979 | Kress | A01K 85/00 43/42.25 |
| 4,217,721 A | * | 8/1980 | Hershberger | A01K 83/00 43/42.1 |
| D269,033 S | * | 5/1983 | Johansson | D22/144 |
| 4,433,503 A | * | 2/1984 | Schleif | A01K 83/00 43/42.1 |
| 4,614,054 A | * | 9/1986 | Fovenyessy | A01K 97/06 43/43.2 |
| 4,744,167 A | * | 5/1988 | Steele | A01K 85/02 43/42.1 |
| 4,790,101 A | * | 12/1988 | Craddock | A01K 85/02 43/42.28 |
| 4,796,378 A | * | 1/1989 | Krueger | A01K 83/00 43/43.4 |
| 4,817,325 A | * | 4/1989 | Thomas | A01K 85/02 43/42.1 |
| 4,827,657 A | * | 5/1989 | Slehofer | A01K 85/00 43/44.2 |
| 4,833,814 A | * | 5/1989 | Zygutis | A01K 97/06 43/43.2 |
| 4,869,012 A | * | 9/1989 | Brenholt | A01K 85/02 43/42.1 |
| 5,031,350 A | * | 7/1991 | Rabideau | A01K 85/02 43/42.1 |
| D324,093 S | * | 2/1992 | Wilson | D22/144 |
| 5,123,199 A | * | 6/1992 | Lysohir | A01K 97/06 43/57.1 |
| 5,386,658 A | * | 2/1995 | Ferguson | A01K 97/26 43/42.37 |
| 5,491,927 A | * | 2/1996 | Ortiz | A01K 85/00 43/42.37 |
| 5,533,296 A | * | 7/1996 | Jansen | A01K 83/06 43/44.2 |
| 5,611,166 A | * | 3/1997 | Day | A01K 85/02 43/42.41 |
| 5,673,508 A | * | 10/1997 | Snyder | A01K 85/00 43/42.37 |
| 5,709,047 A | * | 1/1998 | Link | A01K 85/00 43/42.28 |
| 5,899,015 A | * | 5/1999 | Link | A01K 85/00 43/42.37 |
| 5,960,580 A | * | 10/1999 | Link | A01K 85/00 43/42.53 |
| 6,082,040 A | * | 7/2000 | Burk | A01K 83/00 43/43.2 |
| 6,598,336 B2 | * | 7/2003 | Link | A01K 85/00 43/42.37 |
| 7,069,687 B2 | * | 7/2006 | Jang | A01K 97/06 43/57.1 |
| 7,152,364 B1 | * | 12/2006 | Repine | A01K 97/06 43/57.1 |
| 7,168,202 B2 | * | 1/2007 | Kohler | A01K 97/06 43/43.2 |
| 8,196,336 B2 | * | 6/2012 | Nicholson, III | A01K 85/00 43/42.37 |
| 8,434,258 B2 | * | 5/2013 | Greene | A01K 85/00 43/42.28 |
| 8,484,884 B2 | * | 7/2013 | Zuk | A01K 97/06 43/42.28 |
| 8,793,925 B2 | * | 8/2014 | Rossi | A01K 83/00 43/42.37 |
| 9,125,390 B1 | * | 9/2015 | Kreamalmyer | A01K 85/00 |
| 9,374,989 B1 | * | 6/2016 | Rossi | A01K 83/00 |
| 2009/0307960 A1 | * | 12/2009 | Oelerich, Jr. | A01K 85/00 43/42.1 |
| 2010/0281755 A1 | * | 11/2010 | Armour | A01K 97/04 43/41 |

\* cited by examiner

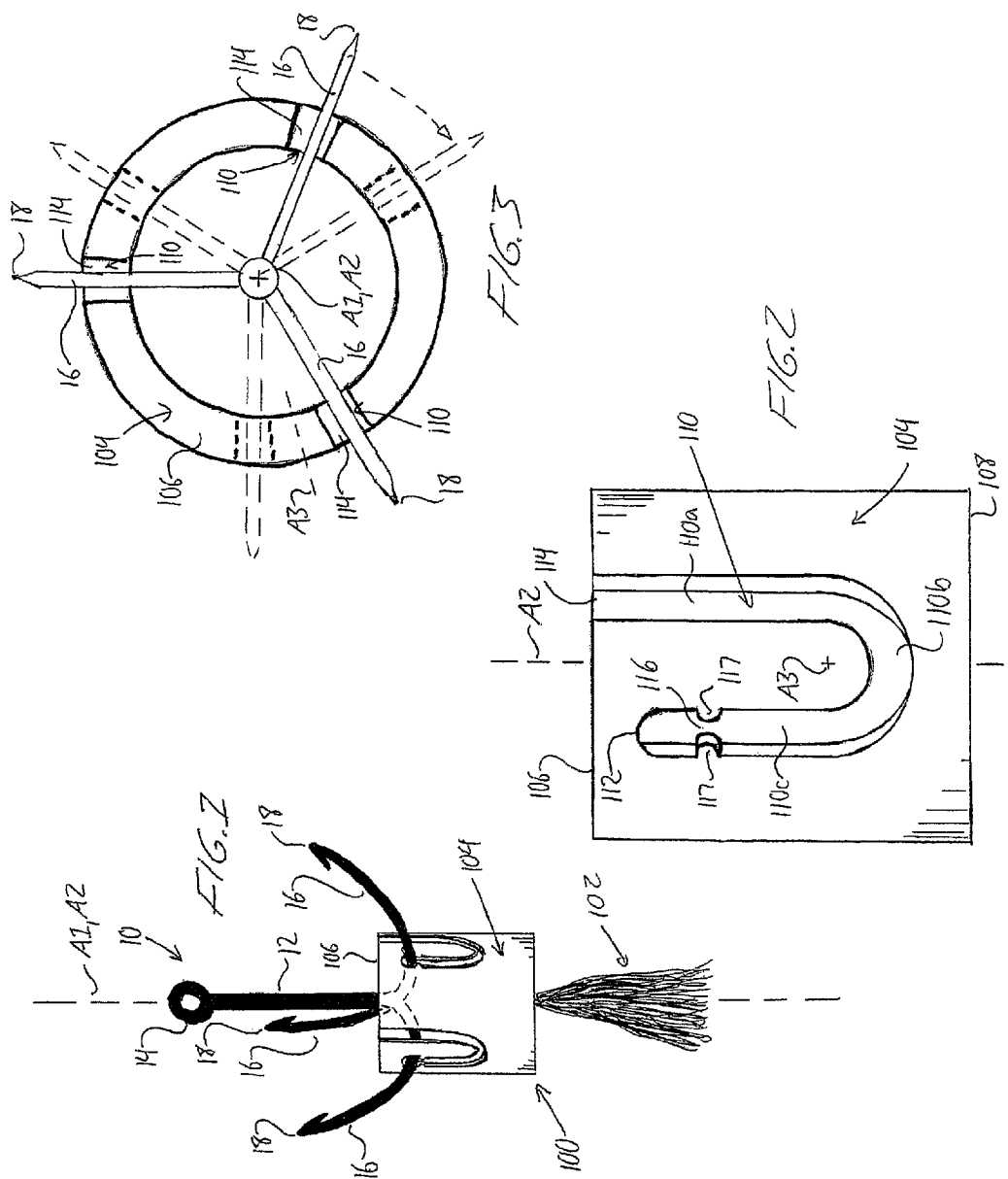

ACCESSORY FOR A TREBLE FISHING HOOK

FIELD OF THE INVENTION

The present invention relates generally to fishing lures, and more particularly to a device operable to engage onto a treble-type fishing hook to attach an accessory on the same during assembly of a fishing lure.

BACKGROUND OF THE INVENTION

It is known in the prior art to provide a device configured to engage about a portion of a fishing hook in order to secure an accessory to the hook to produce a fishing lure of desirable character.

U.S. Pat. No. 5,386,658 teaches fitting of a metallic bead on the shank of a single-point fishing hook in combination with an artificial fly body in order to form a fly fishing lure. The manner in which the bead is fitted on the hook is not compatible with treble-style hooks.

U.S. Pat. No. 5,673,508 teaches a plastic bead sonically bonded to a treble hook at the juncture between the shank of the treble hook and the three hooks bending outward therefrom. The bead carries a skirt, tail or other dressing on the hook. The bonding process requires vibration of the hook and melting of the bead, thus being unsuitable for end-user installation of the dressing, and renders the bead and dressing a permanent installation that is not optionally removable and replaceable by the end-user.

Accordingly, there remains room for improvement in an accessory attachment solution for a treble-style fishing hook.

Other patents concerning attachments for treble-style fishing hooks for various purposes are outlined as follows. However, each differs notably in structure and use from the present invention.

U.S. Pat. No. 890,549 teaches use of a feather type dressing together with a ball-shaped hook guard that protects the three hook points of a treble hook from fouling, but subsequently collapses when the lure is struck to expose the hook points. The guard and dressing are separately attached to the hook.

U.S. Pat. No. 3,683,541 teaches another weed guard that overlies the hook points of a treble-hook to prevent fouling, but gives way in the event of a fish bite in order to maintain the hooking effectiveness of the overall assembly.

U.S. Pat. No. 3,060,620 teaches a skirt that protects the hook points of a treble hook from fouling while doubling as an effective lure. Each hook point is sandwiched between a pair of fins that are cut to form integral streamer tails, but a pliant material is used to maintain the effectiveness of the hook points when the lure is struck by a fish.

U.S. Pat. Nos. 2,204,185, 2,616,209, 5,123,199 disclose hook guards that fully or substantially enclose the hook points of treble-style hooks when the hook is being stored prior to use.

SUMMARY OF THE INVENTION

According to a first aspect of the invention there is provided an accessory for a fishing hook having a shank and a plurality of hooks radiating outwardly therefrom and terminating in respective hook points spaced circumferentially around an axis of the shank and spaced radially outward therefrom in a plane transverse to said shank, the accessory comprising:

an attachment body spanning at least a majority of a circumferential path around a longitudinal axis on which an opening extends into said attachment body;

a plurality of slots in the attachment body that are spaced apart around said longitudinal axis, each slot first comprising:

a first leg extending axially into the attachment body from a first axial end of the attachment body toward an opposing second axial end thereof, and being arranged to receive and engage an intermediate portion of a respective hook of the fishing hook into the slot via an open end of the first leg of the slot at the first axial end of the attachment body; and a bend turning laterally from the first leg to span an angular distance about the longitudinal axis from said first leg, each slot being arranged for sliding of the intermediate portion of the hook axially along the first leg into the bend of the slot, and turning of the fishing hook about the longitudinal axis to slide the intermediate portion of the hook further into the bend of the slot out of alignment with the first leg thereof.

Preferably the bend of each slot joins with a second leg of the slot that extends back toward the first axial end of the attachment body at a distance spaced from the first leg about the longitudinal axis.

Preferably the second leg of each slot is parallel to the first leg thereof.

Preferably the bend of each slot is U-shaped.

Preferably each slot features a constriction at an intermediate location along the slot between the open end of the slot and an opposing closed end thereof, the slot being narrower at the constriction than elsewhere between said open end and said constriction to provide frictional resistance to movement of the respective hook of the fishing hook past said constriction.

Preferably the constriction of each slot is located outside of the first leg of said slot.

Preferably the constriction is provided in the second leg of each slot.

Preferably the constriction comprises a pair of protuberances jutting inwardly from opposing sides of the slot.

Preferably the attachment body closes fully around said longitudinal axis.

Preferably the plurality of slots consists of three slots equally spaced apart around the longitudinal for receipt of three hooks of a treble fishing hook.

Preferably there is provided a dressing attached to the attachment body for carrying of the dressing on the fishing hook by engagement of the attachment body to the hooks thereof.

In use with a fishing hook, the attachment member preferably has an outer diameter less than twice the radial distance of each hook point of the fishing hook from the shank of said fishing hook.

In use with the fishing hook, preferably the attachment member is engaged on the fishing hook to extend about the axis of the shank, each hook of the fishing hook passing through the attachment body at a respective one of the slots therein, and the hook point of each hook residing radially outward of the attachment member.

According to a second aspect of the invention there is provided a method of attaching a fishing lure accessory to a fishing hook having a shank and a plurality of hooks radiating outwardly therefrom and terminating in respective hook points spaced circumferentially around an axis of the shank and spaced radially outward therefrom in a plane transverse to said shank, the method comprising:

(a) providing an attachment body spanning at least a majority of a circumferential path around a longitudinal axis on which an opening extends into said attachment body;

(b) sliding the fishing hook and attachment body relative to one another in a first axial direction inserting a bend of each hook into a respective slot that extends into the attachment body from a first axial end thereof, and continuing to slide the fishing hook and attachment body relative to one another in the first axial direction until the bend of each hook member reaches a bend of each slot at an end of a first leg of the slot opposite the first axial end of the attachment body; and (c) securing the fishing hook and the attachment member together in an installed position in which the hook members pass through the attachment body at the slots thereof to place the hook points outwardly of the attachment member;

wherein step (c) comprises rotating the fishing hook about the axis of the shank to move the bend of each hook out of the first leg of the slot via the bend of the slot.

Preferably step (c) further comprises sliding the fishing hook and the attachment body relative to one another in a second axial direction opposite the first axial direction to move the bend of each hook to a closed end of a second leg of the respective slot that extends back toward the first axial end of the attachment body from the bend of said slot.

Preferably step (c) comprises moving the bend of each hook of the fishing hook past a constriction of each slot, whereby the constriction resists withdrawal of the bend of each hook back past the constriction in order to secure the fishing hook and the attachment body together against inadvertent separation.

BRIEF DESCRIPTION OF THE DRAWINGS

In the accompanying drawings, which illustrate an exemplary embodiment of the present invention:

FIG. 1 is a side elevational view of an assembled fishing lure featuring a treble hook and a skirt style dressing carried by an attachment member that is easily attached and detached from the hook by an end user for selective use of the hook with or without the dressing.

FIG. 2 is a side elevational view of the attachment member of FIG. 1 in isolation, showing a close up view of one of three J-shaped slots therein for coupling the attachment member to the hook through a simple push, turn and pull action.

FIG. 3 is an overhead plan view of the attachment member of FIGS. 1 and 2 illustrating installation thereof onto a treble hook to form the assembled lure of FIG. 1.

DETAILED DESCRIPTION

FIG. 1 shows a fishing lure formed from the assembly of a conventional treble-style fishing hook 10 and a selectively attachable and detachable accessory 100 of the present invention. In a conventional manner, the treble hook 10 features a main shank 12 running on a longitudinal axis A1 and having an eye 14 disposed at one end of the shank 12 for use in coupling the lure to a fishing line. At the opposing second end of the shank, three hooks 16 reach radially outward from the shank 12 and curve or bend back toward the first eye-equipped end of the shank. Each hook 16 terminates at a barbed or unbarbed tip or point 18 that lies at a radial distance outward from the shank in a plane normal to the longitudinal axis A1 at an intermediate location along the axial length of the shank. Each hook resides in a respective plane also containing the shank axis A1, and the planes of the three hooks are equally spaced around the shank axis A1 so as to be spaced apart from one another by 120-degrees.

The accessory 100 features a dressing member 102, which may be in the form of a number of different types of dressing that a fisherman may wish to attach to a fishing hook to form a suitable lure for the targeted type of fish sought by the fisherman. Examples of different types of dressing include skirts, tails, spoons, spinners, etc. Where the present invention is believed most distinct over the prior art is in the attachment member 104 which serves to form a removable and easy-to-install attachment to allow the fisherman to selectively make use of the same hook with or without the accessory, or to swap an accessory of one dressing type for another on the same hook.

The attachment member 104 is in the form of a hollow cylindrical body 104 having an annular wall closing around a longitudinal axis A2, which lies coincident with the shank axis A1 of the treble hook 10 when the attachment member is installed. The cylindrical body thus defines a ring-shaped member that closes a full 360-degree span around the axis A2. The hollow interior of the cylindrical body 104 extends into the body on this longitudinal axis A2 from a first axial end 106 of the cylindrical body. The opposing second end 108 of the cylindrical body may likewise be open, meaning that the cylindrical hollow interior of the body extends fully through the axial length thereof. Alternatively, the second end 106 of the cylindrical body may be closed off, and for example used as a suitable mounting site for permanent or releasable fastening or mounting of the dressing 102 to the attachment member 104.

Three slots 110 are provided in the annular wall of the cylindrical body, each for engagement with a respective one of the three hooks 16 of the treble hook 10 in order to support the attachment member 104 on same. The shape and form of these identical slots is clearly conveyed from the close-up illustration of one such slot in FIG. 2. The slot is substantially J-shaped in form, having a first linear leg 110a that extends into the annular wall of the cylindrical body from the first axial end 106 thereof and runs toward the opposing second axial end 108 in a first axial direction parallel to the longitudinal axis A2 of the body. However, this first leg terminates before reaching the second end 108 of the body, and instead transitions into a U-shaped bend 110b which spans 180-degrees about an axis A3 that is radial to the longitudinal axis A2 of the body, whereby this U-shaped bend or curved 180-degree corner 110b of the slot 110 reverses the direction of the slot back toward the first axial end 106b of the cylindrical attachment body 104.

A second linear leg 110c of the slot continues from the U-shaped bend 110b toward the first axial end 106 of the cylindrical attachment body 104 in a second axial direction, parallel to, but opposing, that of the first leg 110a of the slot. The second leg 110c stops short of the first axial end 106 of the body however, thereby marking a closed end 112 of the slot 100 at an axial distance from the first axial end of the attachment body 104 and at a circumferential distance angularly spaced from where the first leg of the slot juts into the body at the annular end face 106 to define the opposite open end 114 of the J-shaped slot. As an alternative explanation of the slot shape, the slot may be considered to be of a generally U-shaped form in which one of the two parallel legs of the U-shape has been truncated relative to the other.

The width of the slot is substantially uniform over the length thereof between the open and closed ends of the slot, with the exception of a constricted point 116 found in the second leg 110c of the slot at an intermediate location therealong spaced from both the closed end 112 of this leg and the U-shaped bend 110b joined to the other end of this leg. The uniform width of the slot outside the constriction point 116 slightly exceeds the diameter of each one of the identical hooks 16 of the treble hook 10 so that the slot can receive the curved transitional bend of a respective one of the hooks 16 where this hook 16 gradually turns back toward the eye-equipped end of the hook shank 12 at a radial distance outward from the shank. At the constriction 116, the width of the slot tightly matches or slightly interferes with the diameter of the hook 16 so as to provide a frictional resistance to movement of the hook past the constriction when the hook is engaged in the slot in the manner described herein below.

The J-shape of the slots may refer to the shape as viewed from radially outside the cylindrical attachment member, or from within the hollow interior thereof, so long as this shape is consistent among all the slots. That is, the direction around the axis from which the second leg of the slot is spaced from the first leg of the same slot should be the same for all the slots. The illustrated embodiment features slots that are J-shaped as viewed from outside the piece, i.e. the closed end 112 of each slot is located clockwise around the longitudinal axis A2 from the open end 114 of the same slot as viewed from the axial end 106 of the piece at which the open end of the slot is located. The slots are equally spaced around the axis A2, such that the open end 114 of one slot is located 120-degrees (center to center) around the axis from the open end of the adjacent slot. The number and spacing of the slots around the axis A2 of the attachment member 104 thus match the number and spacing of the hooks 16 of the treble hook 10 around the shank axis A1 thereof.

To install the attachment 104 and attached dressing 102 on the treble hook 10, the treble hook 10 and the attachment member 104 are respectively held in opposing hands of a user in positions with the longitudinal axes A1, A2 of these two members aligned and with the hooks 16 of the treble hook respectively aligned with the slots 110 of the attachment member 104, as shown in FIG. 3. As shown, the radial extent of each hook 16 from the shank axis A1 exceeds the outer radius of the cylindrical attachment member 104 relative to the longitudinal axis A2 thereof, whereby the points 18 of the hooks 16 lie on a circular path of diameter that exceeds the outer diameter of the cylindrical attachment member. The two pieces 10, 104 are pushed axially together with the first axial end 106 of the attachment member 104 facing toward the hook-equipped end of the treble hook 10, thereby inserting the curved bends of the hooks 16 into the open ends 114 of the slots 110 in the attachment body. This relative axial movement of the two pieces 10, 104 is continued in the same direction, thus sliding the curved bends of the hooks down the first legs 110a of the slots 110 toward the second end 108 of the attachment member 104 and into the U-shaped bends 110b of the slots 110.

At this point, manual relative rotation between the two pieces 10, 104 is performed about their common central axis A1, A2 in the direction moving the curved bends of the hooks 16 through the U-shaped bends 110b of the slots 110 so as to thereby shift the curved bends of the hooks out of the first legs 110a of the slots and into the parallel second legs 110c of the slots 110. Such movement of the hooks from the first legs of the slots into the second legs of the slots is illustrated in broken lines in FIG. 3.

At this point, relative axial movement of the two pieces is again performed, but in a direction opposing the push-together action previously performed to initially insert the hooks into the slots. Instead, the two pieces are pulled in a drawing-apart or axially-separating direction acting to draw the curved bends of the hooks 16 back toward the first axial end 106 of the attachment member 104. This pulling action is continued until the curved bends of the hooks 16 move past the constriction points 116 into positions disposed between the constriction points 116 and the closed ends 112 of the slots 110. This final step requires sufficient pulling force to overcome the frictional resistance to movement of the hook through the constriction 116, as provided by contact of the outer periphery of the hook with two opposing protuberances or tabs 117 that project inwardly from opposing sides of the slot to define the narrowed or constricted region of the slot. This completes the engagement of the attachment member 104 onto the treble hook 10, whereby the intact portion of the cylindrical wall of the attachment member between the closed end 112 of each slot 110 and the first axial end 106 of the attachment member overhangs the bent portion of the respective hook in order to suspend the entire attachment member 104, and attached dressing 102, from the treble hook 10.

The protuberances 117 at the constriction point 116 of each slot 110 define lock tabs that prevent relative movement of the hook out the fully engaged position adjacent the closed end 112 of the slot, thereby preventing inadvertent movement in a manner that would allow separation of the hook from the slot back through the U-shaped bend 110b and first leg 110a of the slot. However, manual pushing together of the treble hook 10 and attachment member 104 in the first axial direction with sufficient force will overcome the resistance provided by the lock tabs 117, and allow continued relative movement in this direction to displace the hook 16 back into the U-shaped bend. Here, relative rotation of the two pieces about their shared axis A1, A2 in a second direction opposite that which was used during assembly of the pieces will act to withdraw the hook back into the first leg of the slot, where relative axial movement of the two pieces in the second direction will withdraw the hook out of the first leg 110a of the slot 110 via the open end 114 thereof, thereby completing the removal of the attachment member, and attached dressing, from the treble hook.

The attachment member of the present invention can thus be used to install a dressing on a treble hook to form a fishing lure through a simple three-step push, turn and pull process. The lure can subsequently be easily dissembled by removing the attachment member and associated dressing through a similar push, turn and pull process that is substantially similar to the installation process, but features a reversal of the rotational direction in the 'turn' step. When the attachment member is installed on the treble hook 10, each hook 16 thereof passes through the respective slot in the circumferential wall of the attachment member to reach radially beyond the outer periphery of the attachment member and place the hook points at unconcealed positions spaced circumferentially around the attachment member at a radial distance therefrom. This way, use of the attachment member in no way interferes with the hooking action of the resulting fishing lure.

The attachment member may be produced from plastic, metal or other suitable material, for example as a molded plastic piece, a machined plastic piece, or a stamped piece of thin metal rolled into a cylindrical form.

It will be appreciated that the shape of the slots may be varied from that shown and described while similarly allowing engagement of the attachment member onto the hook for hanging support of the attachment member 104 and dressing 102 below the curved lower bends of the treble hook. In one alternate embodiment, the slots may be purely linear and use a simple single-step push-on installation process, and simple single-step pull-off removal process, where a constriction in the single linear leg of the slot provides the sole resistance to inadvertent separation of the hook and attachment member. However, the illustrated embodiment, where both a push and pull action are used in different legs of the same slot, provides an additional degree of protection against inadvertent separation. The two legs need not necessarily be parallel to one another, need not necessarily be separated by a bend of the slot, and need not necessarily be parallel to the axis A2 of the piece, in which case relative turning or rotation between the treble hook and attachment member may be required during the pushing and pulling steps of the assembly and disassembly processes. Some embodiments using two slot legs for a push-turn-pull installation and removal may forgo the inclusion of a constriction point in the slot, but the added locking action of the constriction provides improved prevention of inadvertent separation.

The attachment body need not necessarily close fully around the axis of the hollow interior passage into which the shank is received during assembly, provided that the material used for the attachment body is of sufficient rigidity to maintain the appropriate relative positions of the slots. For example, instead of a closed-ring shape extending fully around the axis, other embodiments may feature an attachment body of a split-ring shape having a gap or break in its circumferential path about the axis. It will also be appreciated that the outer peripheral surface of the attachment body and the hollow interior passage need not be of cylindrical form and circular cross-section in order for the attachment device to operate in the described manner.

The invention claimed is:

1. An accessory for a fishing hook having a shank and a plurality of hooks radiating outwardly therefrom and terminating in respective hook points spaced circumferentially around an axis of the shank and spaced radially outward therefrom in a plane transverse to said shank, the accessory comprising:
a rigidly-shaped attachment body comprising an annular wall extending along a longitudinal axis and spanning at least a majority of a circumferential path around an opening delimited by said annular wall;
a plurality of slots in the annular wall at spaced apart positions around said annular wall, each slot comprising:
an open end at which the slot juts axially into the annular wall at a first axial end thereof;
a first leg extending from the open end of the slot at the first axial end of the annular wall toward an opposing second axial end thereof, and being arranged to receive and engage an intermediate portion of a respective hook of the fishing hook into the slot via the open end of the slot at the first axial end of the annular wall; and
a bend turning laterally from the first leg to span an angular distance from said first leg in a circumferential direction of the annular wall, each slot being arranged for sliding of the intermediate portion of the hook axially into the slot through the open end thereof at the first end of the annular wall and axially onward through the first leg into the bend of the slot, and turning of the fishing hook about the axis of the shank to slide the intermediate portion of the hook further into the bend of the slot out of alignment with the first leg thereof to secure the accessory on the fishing hook;

wherein, from the opening delimited by the annular wall, each slot spans fully through the attachment body in an outward radial direction so that the intermediate portion of the respective hook of the fishing hook reaches outwardly through the slot to situate the respective hook point radially outwardly of the attachment body in an exposed position spaced therefrom to enable use of the fishing hook when the accessory is secured thereon.

2. The accessory of claim 1 wherein the bend of each slot joins with a second leg of the slot that extends back toward the first axial end of the annular wall at a distance spaced from the first leg about the longitudinal axis of the annular wall.

3. The accessory of claim 2 wherein the second leg of each slot is parallel to the first leg thereof.

4. The accessory of claim 2 wherein the second leg of each slot features a constriction at which the slot is narrower than elsewhere between said open end and said constriction to provide frictional resistance to movement of the respective hook of the fishing hook past said constriction.

5. The accessory of claim 1 wherein the bend of each slot is U-shaped.

6. The accessory of claim 1 wherein each slot features a constriction at an intermediate location along the slot between the open end of the slot and an opposing closed end thereof, the slot being narrower at the constriction than elsewhere between said open end and said constriction to provide frictional resistance to movement of the respective hook of the fishing hook past said constriction.

7. The accessory of claim 6 wherein the constriction of each slot is located outside of the first leg of said slot.

8. The accessory of claim 6 wherein the constriction comprises a pair of protuberances jutting inwardly from opposing sides of the slot.

9. The accessory of claim 1 wherein the annular wall of the attachment body closes fully around said longitudinal axis thereof.

10. The accessory of claim 1 wherein the plurality of slots consists of three slots equally spaced apart around the longitudinal axis of the annular wall for receipt of three hooks of a treble fishing hook.

11. The accessory of claim 1 comprising a dressing attached to the attachment body for carrying of the dressing on the fishing hook by engagement of the attachment body to the hooks thereof.

12. The accessory of claim 1 in combination with the fishing hook, wherein the annular wall, at a radially outermost extent thereof from a center of the opening, has a radial measure from said center of the opening that is less than a radial distance of each hook point of the fishing hook from the shank of the said fishing hook.

13. The accessory of claim 1 in combination with the fishing hook, wherein the attachment body is engaged on the fishing hook to extend about the axis of the shank, each hook of the fishing hook passes fully through the attachment body in the outward radial direction at a respective one of the slots therein, and the hook point of each hook resides in the exposed position at a distance spaced radially outward of the attachment body.

14. In combination, a fishing hook having a shank and a plurality of hooks radiating outwardly therefrom and terminating in respective hook points spaced circumferentially around an axis of the shank and spaced radially outward therefrom in a plane transverse to said shank, and an accessory comprising:

a rigidly-shaped attachment body comprising an annular wall spanning at least a majority of a circumferential path around an opening delimited by said annular wall;

a plurality of slots in the annular wall at spaced apart positions around said annular wall, each slot comprising:

an open end at which the slot juts axially into the annular wall at a first axial end thereof;

a first leg extending from the open end of the slot at the first axial end of the annular wall toward an opposing second axial end thereof, and being arranged to receive and engage an intermediate portion of a respective hook of the fishing hook into the slot via the open end of the slot at the first axial end of the annular wall; and a bend turning laterally from the first leg to span an angular distance from said first leg in a circumferential direction of the annular wall, each slot being arranged for sliding of the intermediate portion of the hook axially into the slot through the open end thereof at the first axial end of the annular wall and axially onward through the first leg into the bend of the slot, and turning of the fishing hook about the axis of the shank to slide the intermediate portion of the hook further into the bend of the slot out of alignment with the first leg thereof to secure the accessory on the fishing hook;

wherein, from the opening delimited by the attachment body, each slot spans fully through the attachment body in an outward radial direction, and the intermediate portion of the respective hook of the fishing hook reaches outwardly through the slot and situates the respective hook point in an exposed position at a distance spaced radially outwardly of the attachment body.

* * * * *